H. ARON.
GAS MEASURING INSTRUMENT OF THE WET METER TYPE.
APPLICATION FILED AUG. 14, 1912.
1,063,238.
Patented June 3, 1913.
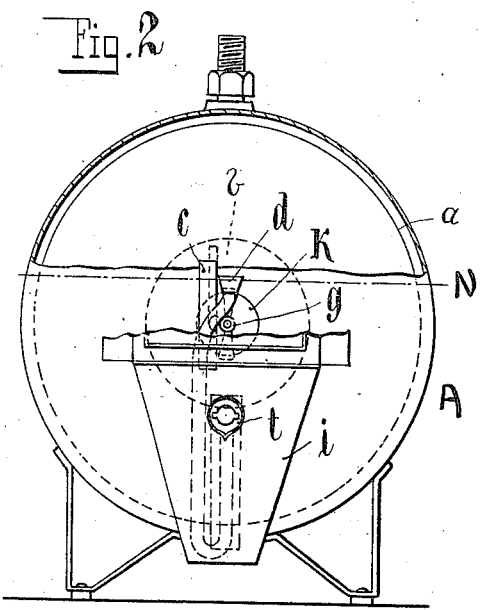
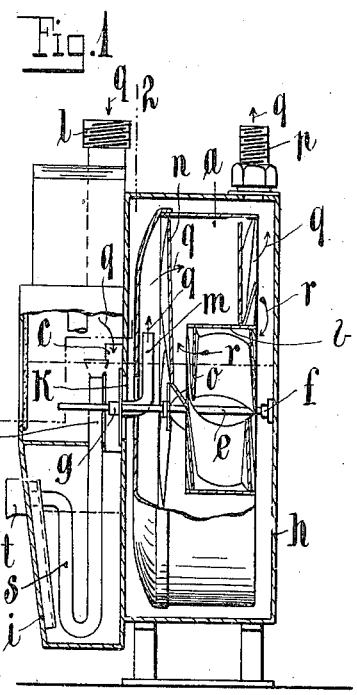
Witnesses
A. Van Loock
C. E. Hunt
Inventor
Hermann Aron
H. B. Willson & Co
Attorneys

UNITED STATES PATENT OFFICE.

HERMANN ARON, OF WILMERSDORF, NEAR BERLIN, GERMANY.

GAS-MEASURING INSTRUMENT OF THE WET-METER TYPE.

1,063,238.   Specification of Letters Patent.   Patented June 3, 1913.

Application filed August 14, 1912. Serial No. 715,081.

*To all whom it may concern:*

Be it known that I, HERMANN ARON, Ph. D., electrician, citizen of Germany, subject of the King of Prussia and Emperor of Germany, residing at Wilmersdorf, near Berlin, in the Kingdom of Prussia and Empire of Germany, have invented new and useful Improvements Relating to Gas-Measuring Instruments of the Wet-Meter Type, of which the following is a specification.

This invention relates to gas measuring instruments of the wet-meter type in which the sealing medium employed is a non-volatile liquid such as a mineral oil and has for its object to provide an improved meter of the above character which shall be reliable in operation and maintain a constant degree of accuracy in measurement under all conditions. In gas meters of this type as usually constructed, even if the sealing liquid maintains its level substantially constant for a long period of time under ordinary conditions, it is necessary to refill the gas meter from time to time since owing to variations in pressure and temperature, etc., the sealing liquid may overflow into the lower liquid chamber through the overflow passage provided for this purpose, so that if the meter is not subsequently refilled the sealing liquid will be too low and thus permit the supply of a larger amount of gas than is registered by the meter and charged to the consumer. This defect can be obviated by raising the level of the overflow passage but a modification of the construction of the meter in this manner is found to give rise to other and more serious objections particularly in the case of gas meters utilizing non-volatile liquids as the sealing medium, since such liquids as I have found are liable to some variations in volume for a certain period of time at the beginning of their use in the gas meter. When a gas meter of this type is refilled with fresh mineral oil it is observed that at first there is a certain rise in the level of the liquid, due to the fact that certain constituents of the gas passing through the meter dissolve in the fresh oil, and thus increase its volume, until when the oil reaches a condition of saturation, any further absorption of the constituents of the gas ceases and the level of the liquid attains a maximum value which is not, however, permanent, the level of the liquid subsequently decreasing to a small extent, until after a comparatively short period of time the level attains a permanent constant value under normal external conditions. Under abnormal conditions, however, especially when the gas meter is installed in an unusually hot or cold place, further alterations may obviously occur in the level of the sealing liquid. Any increase in the level of the overflow passage which as usually arranged also serves to conduct the gas to the interior of the meter, cannot eliminate the error in measurement due to the temporary rise of the level of the liquid and on the other hand no compensation would be effected for a reduction in level. If, however, an overflow and gas conducting passage arranged in the usual manner is employed, the upper extremity of the passage being at the normal level of the sealing liquid, a rise in the level of the liquid to a considerable extent is liable to cause not only the lower liquid chamber to be filled but also the overflow passage above the level of the inlet opening for the gas, so that no gas can enter the meter which would accordingly cease to operate.

In order to obtain accurate measurement of the flow of gas without continual adjustment of the level of the sealing liquid, the improved gas meter of the present invention is provided with an overflow and gas conducting pipe or passage extending above the normal level of the sealing liquid to a considerable extent, the meter being of the well known double drum type so that any error in measurement due to an alteration of the level of the sealing liquid is approximately compensated. The invention thus consists in a combination of two well known features to produce a new result.

The invention is illustrated in the accompanying drawing, wherein—

Figure 1 shows a gas meter constructed in accordance with the invention in a transverse section and Fig. 2 a cross section on line 2—2 of Fig. 1.

Referring now to the drawing the gas meter A is shown therein as comprising two drums $a$ and $b$, the latter being arranged inside the former and in rigid connection therewith. Both drums have curved blades $n$ and $o$. The common axle $e$ of both these drum $a$ and $b$ is arranged in bearings $f$ and $g$, said bearings $f$ and $g$ being fastened to the walls of the casing $h$ for the drums. Before the casing $h$ another casing $i$ is arranged which around the axle $e$ communicates with the casing $h$ through the hole $k$. In the casing $i$ there is arranged an overflow pipe $c$ serving to conduct the gas from the gas inlet $l$ to the measuring drums. The upper extremity of this overflow pipe $c$ is situated considerably above the normal level N of the sealing liquid. A bent tube $m$ connects the pipe $c$ with the interior of the drum $a$.

The gas entering the apparatus through the inlet pipe $l$ flows through the pipes $c$ and $m$ into the drum $a$ in the sense of the arrows $q$ indicated there whereby both drums are revolved. The gas when leaving the drum $a$ partly flows to the outlet pipe $p$ whereas another smaller part of it returns in the opposite direction, through the interior drum $b$ in the sense of the arrows $r$ thickened at their ends. The volume of gas delivered at each revolution of the drums is thus equal to the difference between the volume of the space within the larger drum $a$ above the level of the sealing liquid and the volume of the corresponding space within the smaller drum $b$. Any variation in the level of the liquid thereby causes a smaller difference in the volume of the gas measured than if only one measuring drum were provided.

In order to adjust initially the level of the liquid at the proper position for accurate measurement an upwardly projecting tube $d$ is also provided constituting a level-determining device, the tube $d$ being connected to a U-shaped trap tube $s$ at its lower extremity, so that when the meter A is filled with sealing liquid a small quantity thereof passes into the trap which prevents any escape of gas from the interior of the meter. This tube is closed at its outer end by a cover $t$ after the adjustment is made and then no further liquid can pass into the tube.

The combination above described of the elevated overflow passage and the compensating double measuring drum enables the advantages already mentioned to be obtained. It will be understood that various constructional forms of the improved meter may be adopted without exceeding the scope of the invention.

Having now particularly described and ascertained the nature of my said invention, I declare that what I claim is:—

1. The combination in a wet gas meter of a non-volatile oil employed as a sealing liquid, and a casing acting as a container for the oil, said meter having an overflow passage arranged considerably above the normal level of the sealing liquid to permit a predetermined rise in the level of the oil, and a double measuring drum for compensating for changes in the level of the oil.

2. In a wet gas meter the combination of a non-volatile oil as a sealing liquid and a casing acting as a container for the oil with a considerably elevated overflow passage, a closable level determining tube and two measuring drums arranged one inside the other on a common axle rigidly secured to each other.

In testimony whereof I have hereunto set my hand in presence of two subscribing witnesses.

HERMANN ARON.

Witnesses:
 HENRY HASPER,
 ARTHUR SCHROEDER.

Copies of this patent may be obtained for five cents each, by addressing the "Commissioner of Patents. Washington, D. C."